United States Patent [19]
Davis, Jr. et al.

[11] Patent Number: 4,462,532
[45] Date of Patent: Jul. 31, 1984

[54] DISPLACEMENT SOLDERING DEVICE

[75] Inventors: Wesley O. Davis, Jr., Plaistow, N.H.; Ernest Gallo, Boxford, Mass.

[73] Assignee: EPE Corporation, Manchester, N.H.

[21] Appl. No.: 441,090

[22] Filed: Nov. 12, 1982

[51] Int. Cl.³ .............................................. B23K 1/08
[52] U.S. Cl. .................................................... 228/40
[58] Field of Search ...................... 228/36, 37, 38, 39, 228/40; 118/421, 429

[56] References Cited

U.S. PATENT DOCUMENTS

| | | | |
|---|---|---|---|
| 3,056,372 | 10/1962 | Bassett et al. | 228/37 X |
| 3,532,262 | 10/1970 | Laubmeyer et al. | 228/39 X |
| 3,606,132 | 9/1971 | Rinaldi et al. | 228/40 X |
| 3,828,419 | 8/1974 | Wanner | 228/40 X |

FOREIGN PATENT DOCUMENTS 859069 8/1981 U.S.S.R. ................. 228/36

Primary Examiner—Nicholas P. Godici
Assistant Examiner—P. Weston Musselman, Jr.
Attorney, Agent, or Firm—Hayes, Davis & Soloway

[57] ABSTRACT

A displacement soldering device having first and second ends to support, a PCB over the surface of molten solder in a container, and a support structure handling mechanism having, a first member to which said first end is pivotally attached, a latch, to which said second end is pivotally attached, moveable between latched and unlatched operational positions, said latch in its latched position being pivotally supported on said member and in its unlatched position permitting said support structure to pivot downwardly about said first end, means for lateral displacement of said support structure between a soldering position and a PCB access position, means for unlatching said latch when said solder is displaced into contact with a PCB supported by said support structure, means for latching said latch subsequent to a soldering operation, and means for elevating said support structure during said lateral displacement from said soldering position and for lowering said support structure during said lateral displacement to said soldering position.

9 Claims, 6 Drawing Figures

DISPLACEMENT SOLDERING DEVICE

This invention relates to a displacement soldering device and particularly, though not exclusively, to a mechanism in such a device for handling a printed circuit board (PCB) to be soldered therein.

Reference is made to copending U.S. application Ser. No. 441,120 filed on even date herewith by Harold William Aldous.

Mass production soldering apparatus, including wave soldering machines, are well known for the production soldering of a large plurality of PCB's. These machines are complex and expensive and are economical only where very large production is anticipated. In the frequently encountered medium quantity manufacturing requirements in which the soldering of a circuit board, at a rate of one a minute, for example, will fill production requirements, there has, to date, been no successful and at the same time economical and simple soldering device abel to simultaneously and reliably produce all solder joints desired on a PCB.

It is an object of the present invention to provide a relatively simply effective, efficient and economical soldering device which will fulfills the requirements for the aforesaid medium capacity production.

According to the invention there is provided a displacement soldering device comprising a container for molten solder, a support structure, having first and second ends arranged to support an object to be soldered, such as a printed circuit board (PCB), between said first and second ends, over the surface of solder in the container, means for displacing the surface, when molten, vertically relative to the container and the support structure into contact with such an object, when supported thereby, to effect a soldering operation thereon and a support structure handling mechanism having:

a first member to which said first end is pivotally attached;

a latch, to which said second end is pivotally attached, moveable between latched and unlatched operation positions, said latch in its latched position being pivotally supported on said member and in its unlatched position permitting said support structure to pivot downwardly about said first end;

means for lateral displacement of said support structure between a soldering position and an object access position;

means for unlatching said latch when said solder is displaced into contact with an object supported by said support structure;

means for latching said latch subsequent to a soldering operation; and means for elevating said support structure during said lateral displacement from said soldering position and for lowering said support structure during said lateral displacement to said soldering position.

The invention will now be described, by way of example, with reference to the accompanying drawings, in which.

Figure 1:
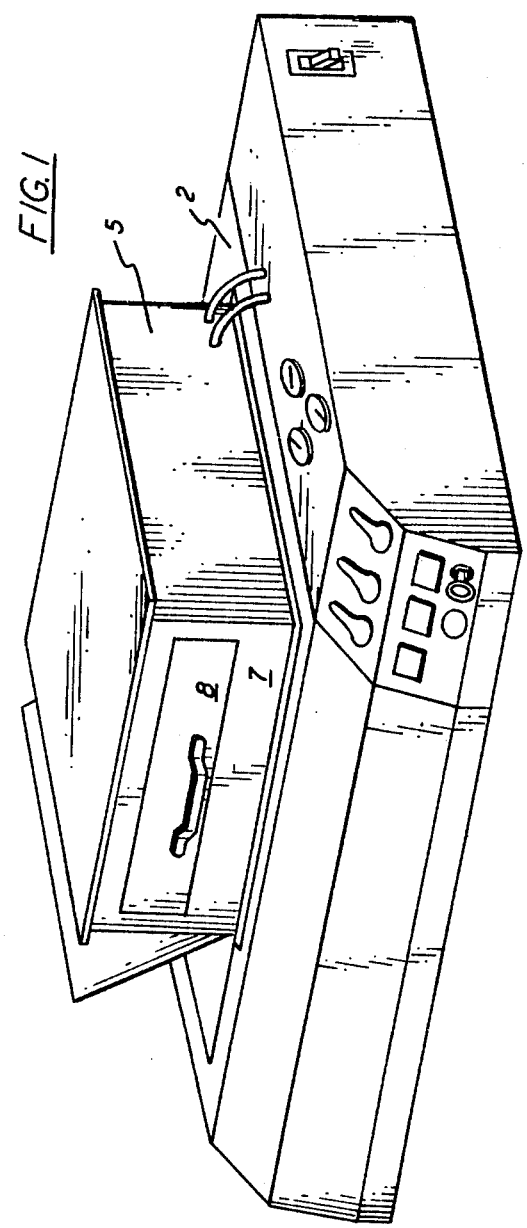
FIG. 1 is a perspective view showing the general layout of a vacuum soldering device.
Figure 2:
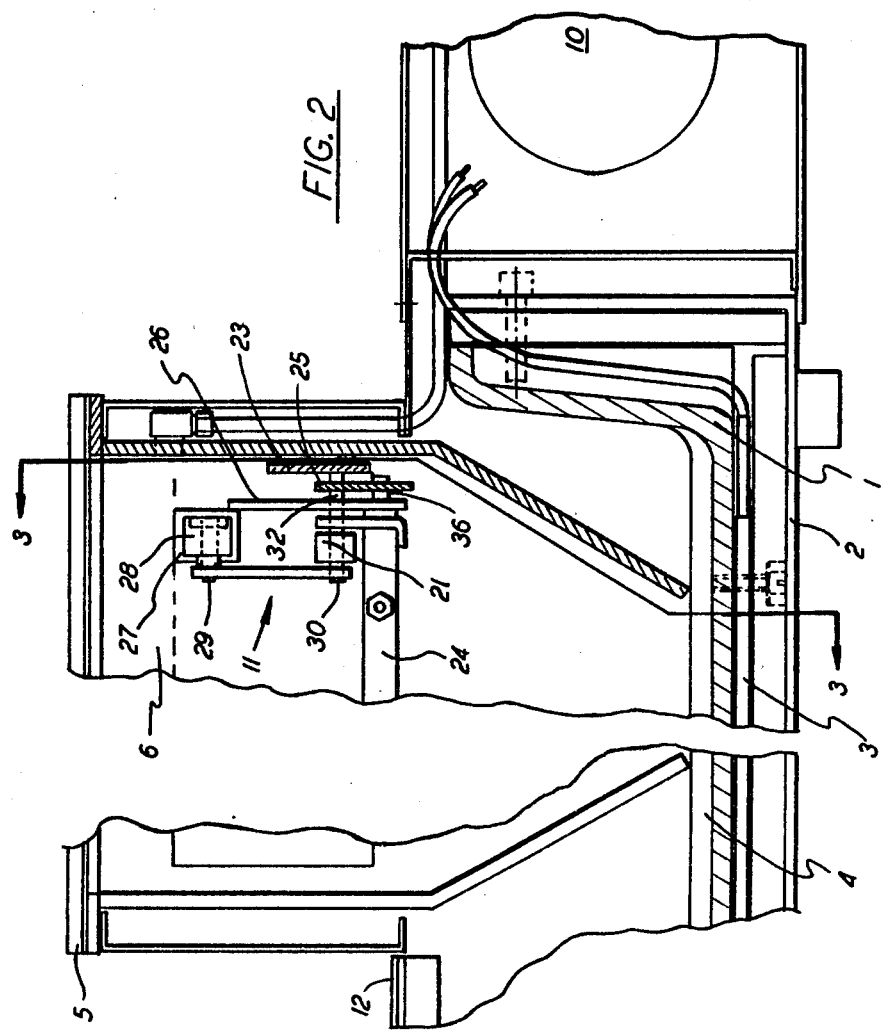
FIG. 2 is a diagrammatic sectional elevation of the device of FIG. 1 taken on Section line 2—2 shown in FIG. 3.
Figure 3:
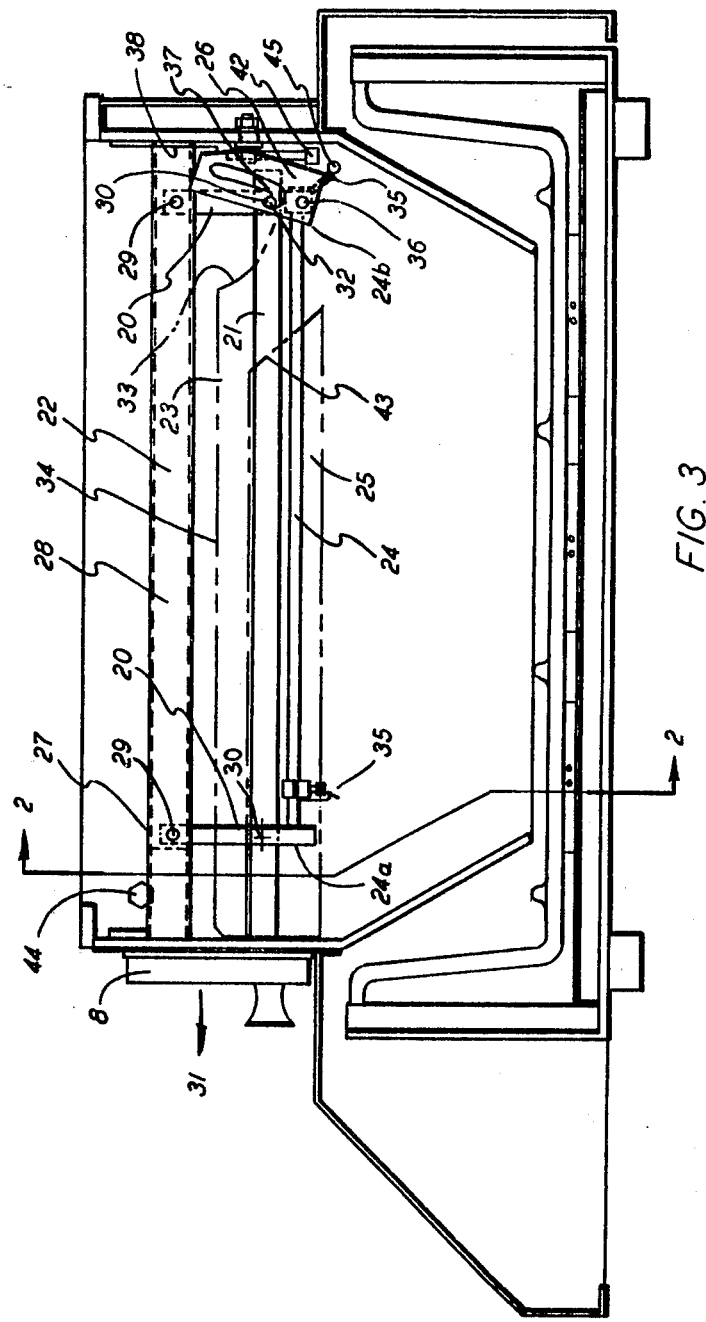
FIG. 3 is a diagrammatic partial sectional elevation on section line 3—3 shown in FIG. 2.

With reference first to FIGS. 1, 2 and 3 a solder pot (container) 1 housed in a main housing 2 over heating elements 3 supports on ribs 4, disposed on the inner surface of the bottom of the pot 1, a vacuum chamber 5 which extends upwardly above the surface of solder contained in the pot to define a vacuum tight chamber 6 closed at its bottom by solder in the tank and on a front face 7 by an appropriately gasketed access door 8. The vacuum tight chamber 6 is connected by a conduit (not shown) to a vacuum pump 10 supported in the main housing 2.

The door 8 is supported by a printed circuit board (PCB) handling mechanism (shown generally at 11), the detailed construction of which will be described below.

To one side of the exterior of vacuum chamber 5 is an access lid 12 which is removable to permit access to the solder pot 1 for the addition or removal of solder.

When the solder is heated by the heating elements 3 to molten state, the application of a partial vacuum to the vacuum tight chamber 6, by operation of the vacuum pump 10, will raise (displace) the surface of the solder within the vacuum tight chamber relative to the level of the solder on the exterior of the vacuum tight chamber by an amount which is dependent upon the reduction in pressure in the vacuum tight chamber relative to the ambient pressure on the surface of the solder exterior to that chamber. The additional solder required as the surface rises within the chamber flows under the bottom edge of the vacuum chamber between the ribs 4. By this means the solder level in the chamber can be raised to meet the underside of a PCB disposed in the chamber to effect soldering operation thereon.

Upon completion of the soldering operation the partial vacuum in the chamber is released and the level of the solder within the chamber drops to the level it occupied prior to application of the partial vacuum with the excess solder in the chamber flowing past ribs 4 outwardly to bring the surfaces of the solder within the chamber and on the exterior of the chamber to the same level.

The mechanism 11 is one of two similar mechanisms disposed in mirror image, one on each side of the vacuum chamber 5 to operate in parallel together. The mechanism on the right hand (as seen in FIG. 2) of the chamber will be described here.

The mechanism 11 comprises a two link parallel arm linkage 20 which supports a swing bar (member) 21 below a slide assembly 22. The swing bar 21 is rigidly attached to the door 8 and is positionally controlled relative to the slide assembly 22 by a swing bar cam 23 (shown in ghost in FIG. 3).

A PCB support structure 24 having a first end 24a and a second end 24b is suspended below the swing bar 21 under the positional control of a support structure cam 25 and a swinging latch 26.

The sliding assembly 22 consists of a slide channel 27 which is rigidly supported in the vacuum chamber and which supports, for sliding motion relative thereto a slide rod, one end of each of the two links of the parallel arm linkage at spaced locations 29. The other ends of these links are pivotally connected in similarly spaced manner to the swing bar 21 at locations 30. On movement in the direction of arrow 31 a pin (cam follows) 32, coaxial with the pivot point 30 of the link at the second end 24b, engages the cam profile 33 of the swing bar cam 23 which swings the swing bar 21 by virtue of the parallel arm linkage 22 to raise (elevate) the swing bar and attached door until the pin 32 reaches the upper support surface 34 of that cam.

Further movement of the door in the direction 31 will slide the slide rod 28 along the slide channel 27 in the direction 31 by means of the swing bar and parallel arm linkage with the slide rod, links and swing bar maintaining the same positions relative to one another throughout such further movement in which the pin 32 engages the upper support surface 34.

The pivot point 30 of the link at said first end 24a and most closely adjacent door 8 is coaxial with the pivotal connection of one end of the PCB support structure 24 to the swing bar 21. The PCB support structure 24 carries PCB support clips 35, at least one of which is adjustable to accommodate different sizes of PCB, and is suspended at its second end 24b by means of the swinging latch 26 to which is pivotally mounted by a pin 36. The swinging latch 26 has a generally J-shape cam slot 37 which engages pin (cam follower) 32. In the position shown in FIG. 3 the PCB support structure is in a position to support a PCB in a horizontal orientation by means of the clips 35. In this position with the door 8 fully closed the swinging latch 26 is resiliently biased by a leaf spring 38 in an anti-clockwise direction about pin 36 but is prevented from moving in this anti-clockwise direction by the interaction of the pin 32 by the profile of the cam slot 37 thereby retaining the PCB support structure in a latched condition.

Figure 4:
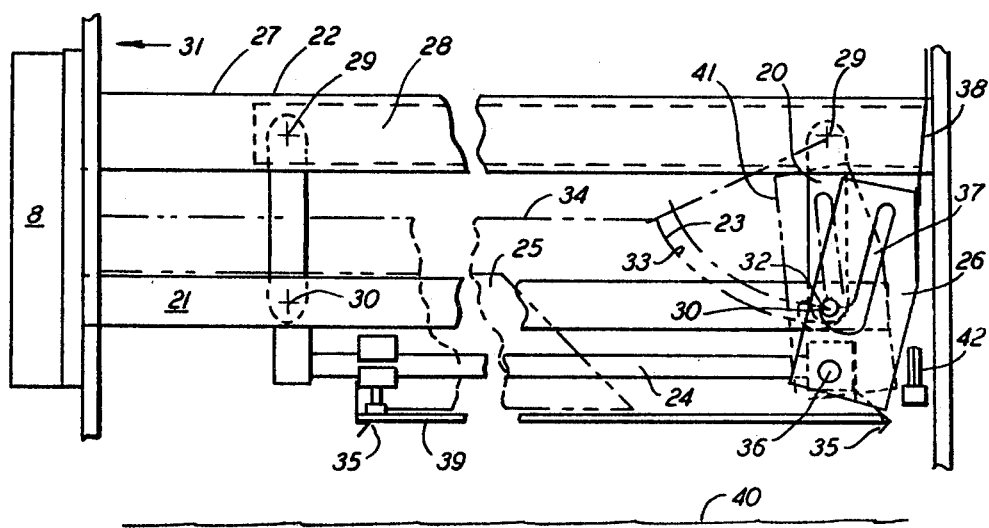
FIGS. 4, 5 and 6 are diagrammatic views, similar to FIG. 3, of the P.C.B. handling mechanism, shown in FIGS. 2 and 3, in various operative states.
Figure 5:
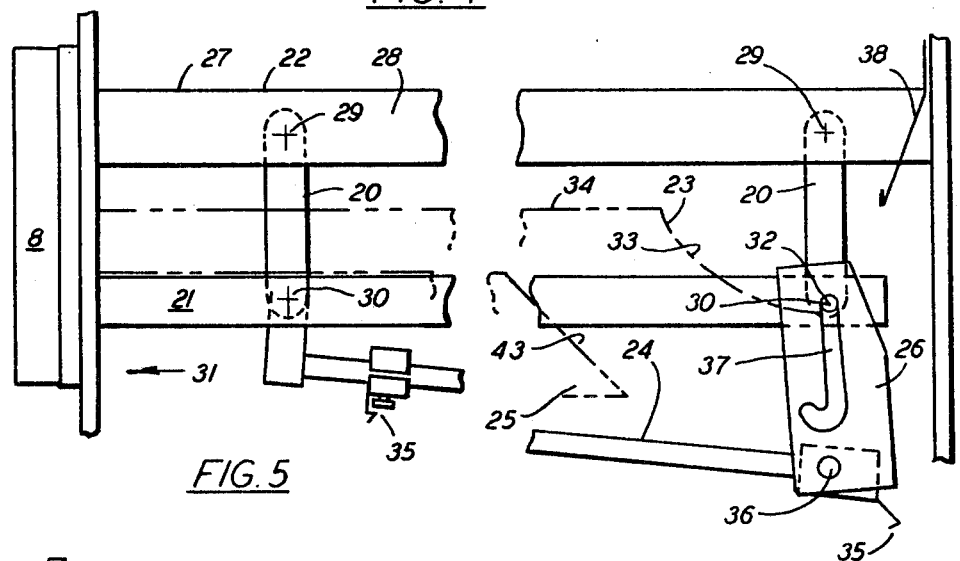

The operation of the mechanism will now be described with reference to FIGS. 4, 5, and 6, FIG. 4 corresponding in essence to the mechanism in the position shown in FIG. 3, with a PCB 39 supported by clips 35 in a horizontal orientation and with a solder level initially as shown at 40. The position of the mechanism indicated in FIG. 4 is the position (soldering position) that it will adopt after a PCB has been attached to clips 35 and the mechanism has been moved in the direction opposite to direction 31 until the door 8 seals against the front of the vacuum chamber. The vacuum pump is then started and the vacuum tight chamber lowered in pressure thereby raising the level of the molten solder from level 40 until it reaches the underside of the PCB 39. The PCB 39 floats upward on the surface of the molten solder pivoting about the pivot 30 at said first end 24a (the left-hand pivot 30 as seen in FIG. 4) thereby slightly raising the swinging latch 26 relative to pin 32. This movement frees pin 32 from latching engagement with the cam slot 37 and permits the spring bias applied by spring 38 to turn the swinging latch anti-clockwise about pin 36 into the position shown in ghost at 31 on FIG. 4, in which the pin 32 is freely moveable up and down the long portion of the J-shaped cam slot 37.

When the molten solder level reaches a desired high level a level, detector 42, which may an infrared detector, a pressure switch, a float operated switch etc., is operated thereby, by means of circuitry not shown to stop the vacuum pump, thereby stopping the rise in the level of the molten solder. The design and operation of this level limit circuitry will be well known to those skilled in the art and is not described herein. The partial vacuum produced by the vacuum pump is retained in the vacuum tight chamber pending controlled release by a pressure release valve (not shown). After the PCB has floated on the surface of the solder for a sufficient time to complete the desired soldering operation on the board the pressure release valve is operated thereby allowing the surface of the solder to return downward toward the level 40. As this level drops, because the swinging latch is in the unlatched condition illustrated in ghost 41 in FIG. 4 the PCB will hinge about at the first end 24a of the support structure pivot 30 following the surface level of the solder downward until the PCB support structure reaches the position illustrated in FIG. 5 with pin 32 preventing the swinging latch 26 from further downward motion. The level of the solder then falls further until it is entirely clear of the underside of the PCB. This pivoting action of the PCB support structure permits the desired angular change of the PCB following the soldering operation to facilitate gravity assisted peel back of surplus solder from the wetted underside of the PCB from the part of the PCB closest to said first end 24a at pivot 30 progressively to the end of the PCB adjacent said second end 24b.

The soldered PCB is now ready for removal from the vacuum soldering device. To achieve this the door 8 is moved in the direction 31, the pin 32 rides up the cam profile 33 of the swing bar cam 23 thereby raising the swing bar 21 by virtue of the parallel arm linking (as described above) and raising the second end 24b of the PCB support structure by virtue of the engagement of pin 32 with the upper end of the "J" cam slot 37 in the swinging latch 36. Pin 36 subsequently engages the angled profile 43 of the support structure cam 35 which with continued motion of the door 8 raises the swinging latch 26 relative to the pin 32 which now is supported on the upper support surface 34. This continues until pin 32 occupies the position in the J-shaped cam slot 37 as illustrated with the swinging latch 26 occupying the position shown in ghost at 41 in FIG. 4 and in ghost at 46 in FIG. 6. From this position the movable portions of the mechanisms are drawn partly through the opening normally closed by the door 8 to an access position to permit removal of the soldered PCB and the introduction of another PCB for a subsequent soldering operation.

Figure 6:
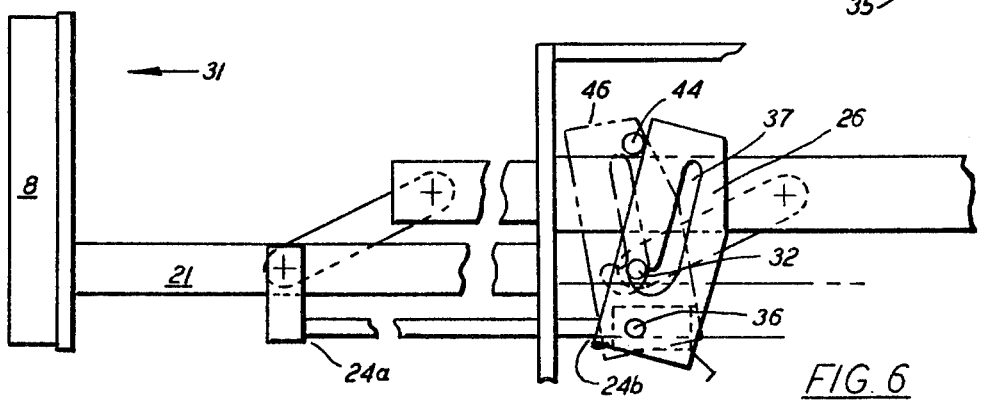

With reference to FIG. 6, when the door reaches substantially its fully open position a stop 44 mounted on the vacuum chamber 5 engages the swinging latch 26 and the swinging latch 26 during the final portion of the movement of the door in the direction 31 is rotated clockwise about pin 36 to bring pin 32 into its fully latched position as described initially with respect to FIG. 3.

Upon the mounting of a PCB to be soldered in the clips 35 the door 8 may again be closed so that the mechanism adopts the position illustrated in FIG. 3 in preparation for the next soldering operation.

Although not illustrated a scraper may be mounted adjacent the right hand clip 35 to automatically skim dross from the operating surface of the solder upon each opening of the door. Further, to assist in the floating of a PCB on the molten surface of the solder a float 45 may be mounted adjacent clip 35 at the second end 35b as shown in FIG. 3.

Although the present invention has been described with respect to displacement of the surface of the solder making use of the differential in pressure on different portions of the surface of the molten solder by the creation of a partial vacuum in a vacuum tight chamber over one of those portions, it will be appreciated that the displacement of the solder surface might be accomplished in other ways without departing from the basic concept of the invention. For example, the surface of the molten solder might be displaced by the introduction of a displacement body into the body of the solder, by the movement of one or more of the containing walls of the solder or by using a pressure in excess of ambient on a portion of the surface of solder at a location remote from the soldering position. It should be noted, however, that the preferred form of the invention in which a partial vacuum is utilized creates a superior soldering environment at the PCB board particularly where through-hole soldering is required or where capillary action is required to assist in the soldering operation.

It will also be appreciated that the mechanism could be modified by eliminating the parallel arm linkage in favor of a second swing bar cam disposed adjacent the door to cooperate with a cam follower fixedly attached to the swing arm, to act in unison with the cam 23, in combination with an extensible rail to support the door end of the swing bar as it is moved laterally after elevation by the cams.

Although the present invention has been described with particular reference to PCB's, it will be appreciated that it is applicable to the soldering of other objects, for example, component leads.

We claim:

1. A displacement soldering device comprising a container for molten solder, a support structure, having first and second ends, arranged to support an object to be soldered, between said first and second ends, over the surface of solder in the container, means for displacing the solder surface vertically relative to the container and the support structure into contact with said object to be soldered, when supported thereby, to effect a soldering operation thereon and a support structure handling mechanism having:
   a first member to which said first end is pivotally attached;
   a latch, to which said second end is pivotally attached, moveable between latched and unlatched operational positions, said latch in its latched position being pivotally supported on said first member and in its unlatched position permitting said support structure to pivot downwardly about said first end;
   means for lateral displacement of said support structure between a soldering position and an object access position;
   means for unlatching said latch when said solder is displaced into contact with said object supported by said support structure;
   means for latching said latch subsequent to a soldering operation; and
   means for elevating said support structure during said lateral displacement from said soldering position and for lowering said support structure during said lateral displacement to said soldering position.

2. A displacement soldering device according to claim 1, wherein said first member is attached to said support structure for lateral displacement therewith.

3. A displacement soldering device according to claim 2, wherein said means for elevating said support structure comprises a parallel arm linkage by which said first member is suspended below a laterally slidable member supported by a guide rail and a cam surface, fixed relative to said guide rail, with which cooperates a cam follower fixedly attached to the said first member to elevate the said first member upon lateral displacement thereof relative to the cam surface.

4. A displacement soldering device according to claim 1, wherein said latch includes a cam slot which cooperates with a cam follower fixedly attached to said first member, which cam follower in cooperation with the cam slot provides said pivotal support of said latch when in its latched position.

5. A displacement soldering device according to claim 4, wherein said cam slot has an elongated portion with which the associated cam follower cooperates when the latch is in its unlatched position to permit said support structure to pivot about said first end to lower said second end and the attached latch.

6. A displacement soldering device according to claim 5 wherein said object is a printed circuit board and said means for unlatching said latch is a spring biasing said latch to the unlatched position, the cam slot being shaped to cooperate with the associated cam follower to prevent unlatching of the latch until said support structure is moved upwardly by a PCB supported thereby upon displacement of said surface of solder into contact with that PCB, said latch then being free to assume its unlatched position under the action of the spring.

7. A displacement soldering device according to claim 6 wherein the means for latching said latch subsequent to a soldering operation is a stop fixedly located relative to said guide rail to engage said latch as said support structure is laterally displaced toward said access position.

8. A displacement soldering device according to claim 1, wherein said means for elevating said support structure includes a support structure cam surface fixed relative to the container and arranged to cooperate with a cam follower fixedly attached to said support structure to elevate said second end during said lateral displacement of said support structure from the soldering position when said latch is in its unlatched position.

9. A displacement soldering device according to claim 5 wherein said elevating means includes a support structure cam surface fixed relative to the container and arranged to cooperate with a second cam follower fixedly attached to said support structure to elevate said second end during said lateral displacement of said support structure from the soldering position when said latch is in its unlatched position thereby to elevate said latch to a position in which it can assume its latched position.

* * * * *

UNITED STATES PATENT AND TRADEMARK OFFICE
CERTIFICATE OF CORRECTION

PATENT NO. : 4,462,532

DATED : July 31, 1984

INVENTOR(S) : Davis, Jr., et al

It is certified that error appears in the above—identified patent and that said Letters Patent is hereby corrected as shown below:

Claim 1, column 5, line 35, the term "when supported thereby" should be deleted.

Signed and Sealed this

Eighteenth Day of December 1984

[SEAL]

Attest:

*Attesting Officer*

GERALD J. MOSSINGHOFF

*Commissioner of Patents and Trademarks*